United States Patent

Saeman

[11] Patent Number: 4,504,457
[45] Date of Patent: Mar. 12, 1985

[54] CONTINUOUS PROCESS FOR PRODUCING GRANULAR CALCIUM HYPOCHLORITE PARTICLES

[75] Inventor: Walter C. Saeman, Cleveland, Tenn.
[73] Assignee: Olin Corporation, Cheshire, Conn.
[21] Appl. No.: 431,427
[22] Filed: Sep. 30, 1982
[51] Int. Cl.³ .............................................. B01D 1/20
[52] U.S. Cl. .................................... 423/474; 159/48.1
[58] Field of Search ................. 423/474; 23/304, 300; 159/45, 48.1

[56] References Cited
U.S. PATENT DOCUMENTS

| | | | |
|---|---|---|---|
| 1,937,613 | 12/1933 | Weber, Jr. | 423/474 |
| 2,374,835 | 5/1945 | Robson | 423/474 |
| 2,441,337 | 5/1948 | Sprauer | 423/474 |
| 2,901,435 | 8/1959 | Robson | 252/187 |
| 3,030,177 | 4/1962 | Mohan, Jr. | 423/474 |
| 3,760,064 | 9/1973 | Droste | 423/474 |
| 3,969,546 | 7/1976 | Saeman | 427/213 |
| 4,276,349 | 6/1981 | Saeman | 428/403 |
| 4,367,209 | 1/1983 | Sakowski et al. | 423/474 |

Primary Examiner—Hiram H. Bernstein
Attorney, Agent, or Firm—James B. Haglind; Donald F. Clements

[57] ABSTRACT

A continuous process for producing granular calcium hypochlorite particles comprises admixing lime and an aqueous liquid in a mixing zone to form a lime slurry. The lime slurry is fed into a crystallizing zone along with a calcium hypochlorite-containing liquid to produce a slurry of coarse dibasic calcium hypochlorite crystals and to elutriate a fines slurry from the crystallizing zone. The coarse dibasic calcium hypochlorite crystals are separated from a dibasic hypochlorite mother liquor and fed to a chlorinating zone. Reaction of the coarse dibasic calcium hypochlorite crystals with a chlorinating agent is conducted to produce a slurry of hemibasic calcium hypochlorite crystals. The slurry is fed to a separator to separate a hemibasic hypochlorite mother liquor from the hemibasic calcium hypochlorite crystals. Hemibasic calcium hypochlorite crystals are chlorinated in the presence of an alkali metal hydroxide to produce an aqueous paste of calcium hypochlorite dihydrate which is sprayed into a heated zone to evaporate water and produce granular calcium hypochlorite particles.

The novel process of the present invention can employ low grade limes where fine particles including dibasic crystals, insoluble impurities and unreacted lime are removed as a slurry from the crystallizing zone. This slurry is chlorinated to produce a calcium hypochlorite-containing liquid which is returned to the dibasic crystallizing zone. Large crystals of highly pure dibasic calcium hypochlorite are produced as an intermediate product. These dibasic crystals are chlorinated to produce hemibasic calcium hypochlorite crystals as a further intermediate product. Chlorination of the hemibasic crystals yields a slurry of sufficiently high Ca(OCl)$_2$ assay to meet the specifications for a marketable product. This process eliminates the filtration of calcium hypochlorite dihydrate slurries required in previous commercial processes as well as the need to remove solid sodium chloride.

8 Claims, 3 Drawing Figures

CONTINUOUS PROCESS FOR PRODUCING GRANULAR CALCIUM HYPOCHLORITE PARTICLES

This invention relates to a process for producing granular calcium hypochlorite particles. More particularly, this process relates to the production of multi-layered granular calcium hypochlorite particles.

In most methods for the commercial manufacture of calcium hypochlorite, a slurry is obtained containing crystals of calcium hypochlorite dihydrate in a cool aqueous solution of calcium hypochlorite and sodium chloride or other inorganic halide. The slurry is filtered to produce a cake containing water limited to amounts of from about 42 to about 48 percent by weight.

Filtration of the neutral dihydrate slurries is a requirement for many drying and granulation methods in commercial use because of the high cost of the drying equipment, the thermal energy required to volatilize the residual water in the wet filter cakes; and the thermal decomposition losses of the $Ca(OCl)_2$ which are associated with the drying and granulation process. Good filterability of slurries is therefore a necessity because excess filtrate retention in the wet filter cake increases the amount of water to be evaporated thereby increasing energy cost and reducing the productive capacity of the dryer, with an additional increase in the amount of $Ca(OCl)_2$ lost by thermal decomposition. Where filtration is a necessary adjunct of the drying and granulation process, there is no incentive to up-grade the assay of the neutral dihydrate slurry prior to drying since the filter cake assay is up-graded sufficiently by preferential removal of dissolved inorganic halide, usually NaCl, in the filtrate.

There are available other drying and granulation processes which are designed to handle a slurry of neutral dihydrate crystals directly without the need for filtration to reduce the water volatilization load on the drying and granulation system. Typical of these is the spray drying method in which a finely atomized slurry of the crystals is exposed to drying gases of sufficiently high temperature to volatilize the water in a matter of seconds. The dry hypochlorite product emerges as a powder. Decomposition losses are held to tolerable values by virtue of the short exposure time. Even so, sufficient variation in the size of the atomized droplets occurs to allow incomplete drying of the larger droplets. Such droplets stick to the walls of the drying chamber and undergo excessive decomposition. The spray dried hypochlorite powder must then be compacted in the dry state. This again is a relatively costly operation. The unsatisfactory performance of the spray dryer and mechanical compacting systems has limited the applicability of this method in comparison to other drying systems using filtration of the neutral crystalline dihydrate slurries to allow transfer of the hypochlorite to the drying and granulation system as a wet cake.

Of more recent origin is the drying method designated as "spray graining". This is also adaptable to the utilization of the neutral slurry of dihydrate crystals directly without the need for intermediate filtration. Volatilization of water occurs at high thermal efficiency and at high mass transfer rates in a compact drying system. The drying system is, therefore, not burdened with excessive additional costs for volatilizing the water in the neutral dihydrate slurry. Granulation occurs simultaneously with the volatilization of water so that there is no need for the additional costly operation of the mechanical system for compacting dry powder as is the case for the spray dried powder. Typical applications of the spray graining method for drying and granulating neutral crystalline slurries of the dihydrate crystals are described in the patents issued to W. C. Saeman (U.S. Pat. No. 3,969,546, issued July 13, 1976; U.S. Pat. No. 4,005,087, issued Jan. 25, 1977; U.S. Pat. No. 4,118,524, issued Oct. 3, 1978 and U.S. Pat. No. 4,276,349, issued June 30, 1981). Spray graining requires the availability of a neutral dihydrate slurry in sprayable, pumpable condition. There is, therefore, no need for filtration except for slurry assay enhancement by removal of excess NaCl as dissolved salt in the filtrate. Other methods for producing high assay neutral dihydrate crystal slurries are, therefore, preferred.

Typical of a process modification intended to eliminate the need for filtering slurries of the neutral crystalline dihydrate, which often exhibit unexplainable variations and deficiencies in the rate of filtration and the wetness of the recovered cake, is the patent by Weber (U.S. Pat. No. 1,937,613, issued Dec. 5, 1933) in which the lime slurry is first chlorinated to the dibasic or monobasic composition with crystals of sufficient size to allow effective isolation from the calcium chloride mother liquor in which they are grown. Deficiencies in the filtration rate of the dibasic crystal are more easily avoided than for the neutral dihydrate crystal. The process of U.S. Pat. No. 1,937,613 requires, however, as a reactant solid salts containing sodium hypochlorite, i.e., $NaOCl.5H_2O$ or $Ca(OCl)_2.2NaOCl.NaCl.12H_2O$. Where these solid NaOCl compositions are used in the manufacture of the calcium hypochlorite compounds, the temperatures are preferably maintained below 10° C. by refrigeration to avoid any unnecessary loss or hazard by decomposition of the compound. Thus the process requires added expense for refrigeration and, in addition, there are undesirable hazards in handling $NaOCl.5H_2O$.

U.S. Pat. No. 2,901,435, issued Aug. 25, 1959, to H. L. Robson describes a spray drying process for calcium hypochlorite which employs a slurry prepared by mixing sodium chloride particles of controlled particle size with an aqueous slurry of calcium hypochlorite. To achieve the desired particle size range, the salt must be ground and classified which results in increased costs for materials. The problems with the spray drying method for producing granular calcium hypochlorite have been discussed above.

Typical of the art for enlarged growth of dibasic calcium hypochlorite crystals is U.S. Pat. No. 2,441,337, issued May 11, 1948, to J. W. Sprauer. Sprauer's object is to grow large crystals to enhance the rate and efficiency of mother liquor separation from the crystal. The impurity of significance is the co-produced calcium chloride dissolved in the mother liquor. The presence of $CaCl_2$ in the dibasic calcium hypochlorite crystals not only lowers the assay of the desired product, but also results in undesirable hygroscopic behavior on exposure to the atmosphere.

The prerequisites identified by Sprauer for satisfactory crystallizer performance are (1) a suspension of seed crystals on which growth can occur, (2) low residual of active hypochlorite ion in the mother liquor, and (3) suppression of the sources of nucleation. He finds that the nucleation rate may be minimized (a necessary condition for the growth of large crystals) by maintaining a suspension of well formed crystals in the crystallizer as the first of the essential prerequisites. As a second prerequisite, the $Ca(OCl)_2$ concentration of the mother liquor must be sufficiently low so that there is no spontaneous combination of the hypochlorite ion and calcium ion to form crystalline nuclei. In other words, the suspension of the dibasic crystal and an excess of solid $Ca(OH)_2$ can exist in equilibrium with the mother liquor without any further change in the latter. This condition also satisfies the third prerequisite whereby the spontaneous formation of new nuclei is prevented when the lime is added to this recycled mother liquor. A slow and regulated addition of hypochlorite ion can then be made to offset the hypochlorite ion concentration in the direction in which calcium ions and hypochlorite ions combine to form the dibasic crystal. By operating in a suspension of such dibasic crystals, this combination results in the immediate growth of the existing seed crystals thereby limiting supersaturation of the hypochlorite to values less than the threshold for inducing spontaneous nucleation. With effective suppression of spontaneous nucleation, continued growth of the existing crystal is sustained to a sufficiently large size to enhance the effectiveness and rate of separation of the $CaCl_2$-containing mother liquor from the crystalline dibasic calcium hypochlorite. Because of the limitations in the maximum allowable supersaturation, the rate of growth of the existing crystal can also be controlled to growth rates compatible with sound crystal structure thereby suppressing the possible inclusion of mother liquor and other impurities within the crystal structure.

In Sprauer's method of crystallization, the controlled rate of addition of the hypochlorite ion is by a controlled rate of chlorine addition to the suspension within the crystallizer or by the controlled rate of addition of an enriched hypochlorite solution (such as filtrate) generated externally to the crystallizer. In either case, an excess of solid $Ca(OH)_2$ must also be present in the suspension. When the calcium ion in the solution is depleted by combination with hypochlorite ion to form the dibasic crystal, more of the solid $Ca(OH)_2$ then dissolves to replenish that which was lost. The calcium ion concentration in solution is thereby stabilized.

Sprauer also found that control of his crystallizer is enhanced by batchwise operation of the crystallization procedure. To this end he advises that lime and hypochlorite additions to the suspension be made alternately and intermittently so that the mother liquor composition is always restored to its equilibrium composition value at the end of each feed cycle of lime and hypochlorite ion. At suitable times, additional withdrawals of mother liquor and crystals can be made to avoid a weight of crystals in the crystallizer too heavy for the agitation system to handle and also to dispose of the $CaCl_2$ which is generated as a coproduct from the chlorination of lime.

A further finding by Sprauer is the improvement in yield of the dibasic crystal from the mother liquor by a terminal addition of NaCl to the final mother liquor of a batch. The concentration of soluble hypochlorite ion is thereby suppressed to force additional growth of the dibasic crystal. NaCl additions, when made earlier in the batch sequence, are said to increase the nucleation rate thereby suppressing the maximum size of dibasic crystal attainable. Coarse crystals are desired to enhance the rate and effectiveness of mother liquor removal from the dibasic calcium hypochlorite.

Further development of the art is described in U.S. Pat. No. 3,030,177, issued Apr. 17, 1962, to J. C. Mohan, Jr. The essential conditions for good crystal growth defined by Sprauer are again recognized but conditions of operation are modified to allow continuous operation of the crystallizer. This is done by stage-wise operation in a three stage system. Raw lime feed is slurried in a mother liquor of low residual active hypochlorite ion concentration to suppress the formation of new nuclei in the first stage. The source of this mother liquor is the partially depleted effluent from the second stage of the process. With this recycle stream, there is also a return of a suspension of dibasic crystal to serve as seed for the additional growth which subsequently occurs as this slurry is contacted with an enriched source of hypochlorite ion, such as filtrate saturated with $Ca(OCl)_2$, in the second stage of the reactor. The recycle rate is held in proportion to the lime and hypochlorite addition rates to maintain a concentration of active hypochlorite ion at a low level of residual activity for the effluent from the second stage. A third stage follows in which the residual of active hypochlorite ion leaving the second stage is more fully depleted and also to provide opportunity for further additions of NaCl to depress the concentration of hypochlorite still further with the opportunity for increasing the yield of the dibasic crystal from the feed liquor entering the system. Thus the main objective of the process of U.S. Pat. No. 3,030,177 is the effective recovery of soluble hypochlorite values from filtrate streams.

In both of the above processes, the crystal size attainable is limited by minimizing the natural nucleation rate. Since the natural nucleation rate increases faster than the production rate with increasing supersaturation, the greater the production rate, the smaller the crystal. The advantage claimed for enlarged crystals are therefore progressively diminished as the production rate is increased.

It is known to increase the production rate of crystals by the process of forced-growth crystallization in which excess nucleation is controlled by the elimination of excess fine crystals from the crystalline suspension. The fine crystals are removed from the suspension by elutriation in a solvent and redissolved by heating or dilution with additional solvent. U.S. Pat. No. 2,737,451 issued to W. C. Saeman describes a forced-growth process for producing large, strong crystals of ammonium nitrate at high production rates. The process operates with a suspension of crystalline ammonium nitrate in a supersaturated solution of ammonium nitrate where the supersaturation is maintained by vacuum evaporation of solvent from the mother liquor.

In the forced-growth crystallizer described by W. C. Saeman in U.S. Pat. No. 2,856,270, large crystals are obtained at maximum production rates. Controlled flow of the mother liquor under self-regulating conditions is maintained from internally generated hydrostatic forces in a submerged fines trap. The top surface of the suspension is thereby made available for the controlled evaporation of solvent from heat sources embedded within the suspension.

U.S. Pat. No. 2,883,273, issued to W. C. Saeman, describes a forced-growth process adapted for operation at reduced pressure and reduced temperature by vacuum evaporation of solvent from the mother liquor. The surface of the suspension is enclosed to allow evaporation of solvent under reduced pressure conditions. The fines trap is positioned submerged in the suspension and the method of operation and control also permit operation under sub-atmospheric pressures.

The design of crystallizers suitable for use in forced-growth crystallization processes is described in an article by W. C. Saeman (Ind. and Eng. Chem. 53, 612–622, August 1961). A distinction is made between methods of crystal size control by (1) controlling the rate of nucleation and (2) by controlling the intermediate seed rate to the suspension. Differentiation is also made with respect to growth inducement in suspension crystallizers by evaporation of solvent, by cooling, and by salting-out and chemical reaction. The essential conditions for achieving intermediate seed rate control by the employment of fines traps is also specified.

The forced-growth crystallization of active chlorine containing compounds such as calcium hypochlorite is not taught in these publications.

Thus there is a need for a process for producing calcium hypochlorite in which insoluble impurities in low cost lime sources are readily removed during the formation of large crystalline intermediate compounds at production rates which are suitable for commercial processes; which eliminates the need to filter slurries of calcium hypochlorite dihydrate; and which does not require the addition or removal of a solid alkali metal chloride.

It is a primary object of the present invention to provide a continuous process for producing calcium hypochlorite in which low grade lime sources can be employed.

An additional object of the present invention is to provide a process for efficiently and readily removing insoluble impurities from slurries of calcium hypochlorite crystals.

Another object of the present invention is to provide a process for producing calcium hypochlorite in which filtration of slurries of calcium hypochlorite dihydrate is not required.

A still further object of the present invention is to provide a process for producing calcium hypochlorite which does not require the addition or removal of solid sodium chloride.

Yet another object of the invention is to provide a process for producing dibasic calcium hypochlorite by employing forced-growth crystallization technology to achieve large crystal sizes at the maximum production rate in the most compact equipment.

One other object of the invention is to provide a process for co-producing calcium chloride in a concentrated and purified form suitable for recovery for commercial applications.

An additional object of the present invention is to provide a process for producing calcium hypochlorite slurries suitable for spray graining apparatus.

These and other objectives of the present invention are accomplished in a continuous process for producing granular calcium hypochlorite particles which comprises:

(a) admixing lime and an aqueous liquid in a mixing zone to form a lime slurry;
(b) feeding the lime slurry to a crystallizing zone;
(c) feeding into the crystallizing zone a calcium hypochlorite-containing liquid to react with the lime to produce a slurry of coarse dibasic calcium hypochlorite crystals and to elutriate a fines slurry comprised of particles of unreacted lime from the crystallizing zone;
(d) conveying the fines slurry to a fines chlorinating zone;
(e) chlorinating the fines slurry to produce the calcium hypochlorite-containing liquid and returning the calcium hypochlorite-containing liquid to the crystallizing zone;
(f) separating the coarse dibasic calcium hypochlorite crystals from a dibasic hypochlorite mother liquor;
(g) reacting the coarse dibasic calcium hypochlorite crystals with a chlorinating agent to produce a slurry of hemibasic calcium hypochlorite crystals;
(h) separating the hemibasic calcium hypochlorite crystals from a hemibasic hypochlorite mother liquor;
(i) reacting the hemibasic calcium hypochlorite crystals with chlorine in the presence of an aqueous alkali metal hydroxide solution to produce an aqueous paste of calcium hypochlorite dihydrate; and
(j) spraying the aqueous paste of calcium hypochlorite dihydrate into a heated zone to evaporate water and produce granular calcium hypochlorite particles.

Figure 1:
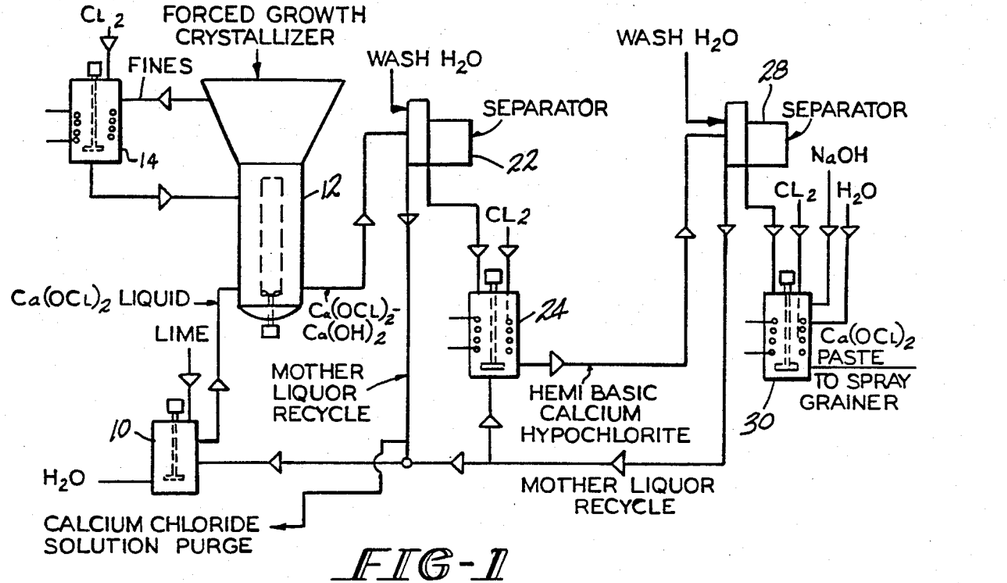
FIG. 1 represents a flow sheet of one embodiment of the process of the present invention.

In the process of FIG. 1, highly active lime is fed to mixing tank 10 where it is admixed with basic mother liquor from dibasic separator 22 and hemibasic separator 28, water or mixtures thereof to form a slurry.

The lime slurry is pumped to the lower portion of forced-growth crystallizer 12. Coarse crystals of dibasic calcium hypochlorite are produced in forced growth crystallizer 12 where the lime slurry is reacted with an aqueous solution of calcium hypochlorite or a slurry of neutral calcium hypochlorite dihydrate crystals.

This calcium hypochlorite-containing liquid is produced by withdrawing a fines slurry comprised of unreacted lime particles and fine crystals of dibasic calcium hypochlorite from the upper portion of forced-growth crystallizer 12; chlorinating the fines to the neutral end point in fines chlorinator 14 by the addition of chlorine; and recycling the solution or slurry to the lower portion of forced-growth crystallizer 12. Supplemental chlorine may also be added to forced-growth crystallizer 12 to produce additional hypochlorite solution, if required to satisfy the process stoichiometry.

Coarse dibasic calcium hypochlorite crystals produced in forced-growth crystallizer 12 are pumped as a slurry in mother liquor to dibasic separator 22. Dibasic separator 22 is any suitable liquid-solid separator which allows the coarse dibasic crystals to be separated from the mother liquor and any insoluble fine particles in the mother liquor. Preferred as dibasic separator 22 is a screen bowl centrifuge or a screen filter. A portion of the dibasic mother liquor recovered is recycled to mixing tank 10 and the balance is purged to remove coproduced $CaCl_2$ from the system. The cake of dibasic calcium hypochlorite crystals recovered from dibasic separator 22 is conveyed to dibasic chlorinator 24 with sufficient amounts of recycle hemibasic mother liquor to produce a processable slurry. Chlorine is added to dibasic chlorinator 24 in amounts sufficient to produce crystals of hemibasic calcium hypochlorite. The slurry of hemibasic calcium hypochlorite crystals in mother liquor is conveyed to hemibasic separator 28. Mother liquor recovered from hemibasic separator 28 is recycled to mixing tank 10 and to dibasic chlorinator 24.

Hemibasic calcium hypochlorite crystals are transported to hemibasic chlorinator 30 where they are admixed with caustic soda, water and chlorine to produce a neutral calcium hypochlorite dihydrate paste suitable for use in a spray graining apparatus (not shown).

Figure 2:
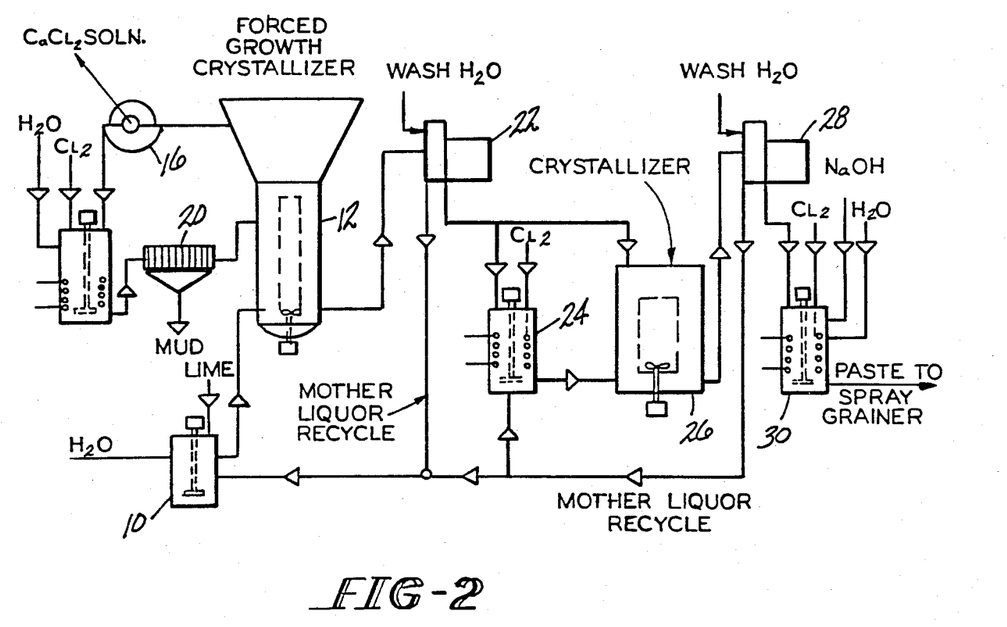
FIG. 2 depicts a flow sheet of an alternate embodiment of the process of the present invention.

In the embodiment of FIG. 2, a less active lime containing a moderate amount of insoluble impurities is added to mixing tank 10 to be admixed with the basic calcium hypochlorite mother liquor. The fines slurry recovered from the upper portion of forced-growth crystallizer 12 also contains insoluble impurities and is conveyed to fines separator 16 which separates a $CaCl_2$ solution, which is purged, from a solids cake. The solids cake is fed to cake chlorinator 18 where it is slurried in water and chlorinated to form a slurry of insoluble lime impurities in a solution of calcium hypochlorite. The slurry is pumped to mud separator 20 where the insoluble impurities are removed as mud and the calcium hypochlorite solution is returned to forced-growth crystallizer 12. Mud recovered from mud separator 20 is suitably disposed of, for example, as landfill.

A portion of the cake of dibasic calcium hypochlorite crsytals recovered from dibasic separator 22 is conveyed to dibasic chlorinator 24 with sufficient amounts of mother liquor to produce a processable slurry. Chlorine is added to dibasic chlorinator 24 in amounts sufficient to form neutral calcium hypochlorite dihydrate crystals. The slurry of neutral calcium hypochlorite dihydrate crystals is transported from dibasic chlorinator 24 to hemibasic crystallizer 26. Also added to hemibasic crystallizer 26 is another portion of the cake of dibasic calcium hypochlorite removed from dibasic separator 22. Hemibasic calcium hypochlorite crystals are formed upon admixing the dibasic calcium hypochlorite with the neutral calcium hypochlorite dihydrate crystals. The slurry of hemibasic calcium hypochlorite crystals is transported to hemibasic separator 28 and the separted hemibasic crystals conveyed to hemibasic chlorinator 30 and chlorinated as discussed above to produce a neutral paste of calcium hypochlorite dihydrate crystals which is suitable for spraying to produce granular $Ca(OCl)_2$.

Figure 3:
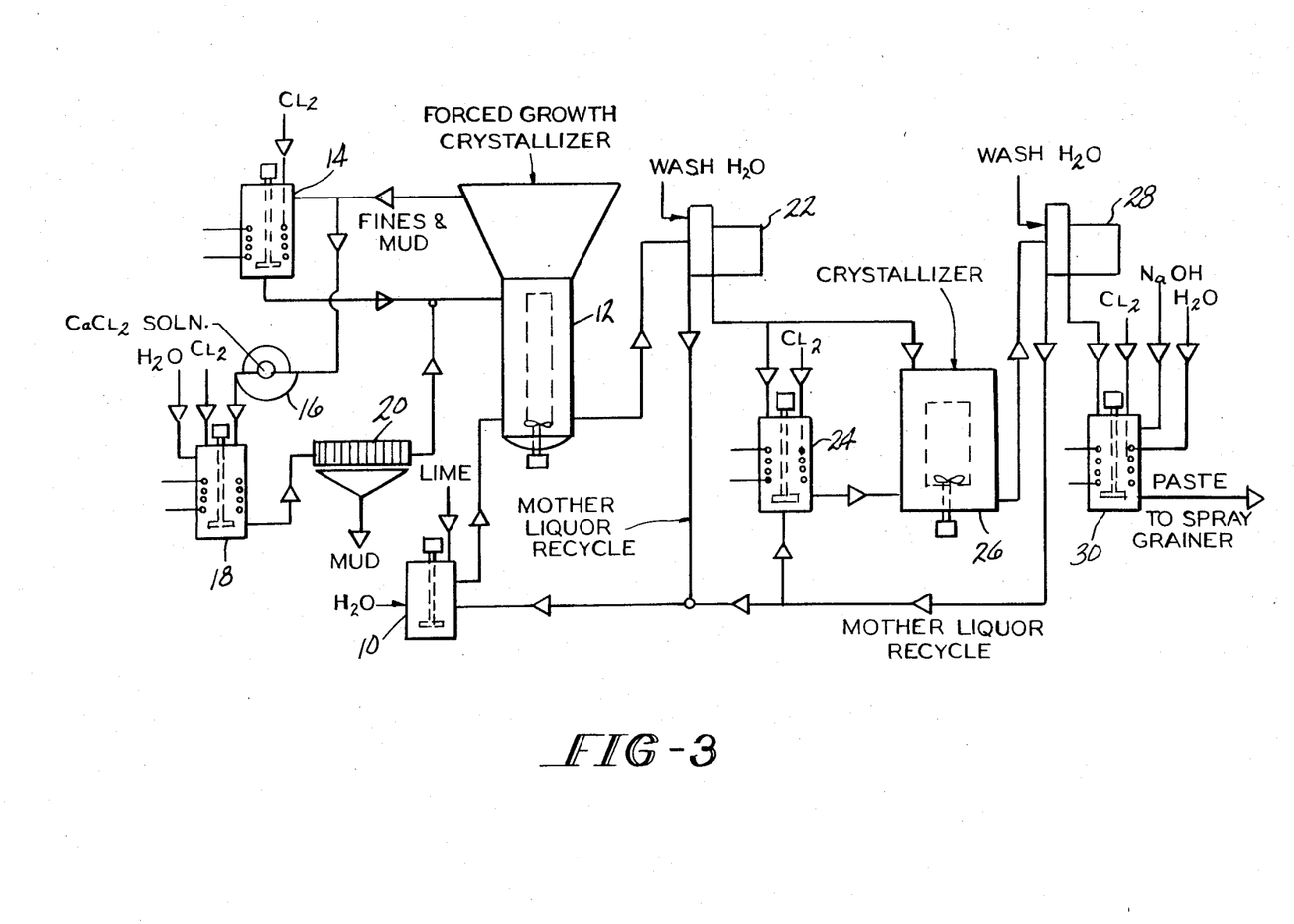
FIG. 3 illustrates a further embodiment of the process of the present invention.

The embodiment of the process represented by FIG. 3 is particularly suitable for employing low grade lime sources having relatively high concentrations of insoluble impurities. A portion of the fines slurry recovered from crystallizer 12 is fed to fines chlorinator 14. Chlorine is added to fines chlorinator 14 where the chlorine reacts with the dibasic calcium hypochlorite and unreacted lime to produce a slurry of insoluble lime impurities and $Ca(OCl)_2.2H_2O$ crystals in a concentrated calcium hypochlorite solution. The slurry is returned to forced-growth crystallizer 12. The remaining portion of the fines slurry from crystallizer 12 is fed to fines separator 16 which separates a clean $CaCl_2$ purge liquor from a solids cake. The solids cake is fed to cake chlorinator 18 where it is slurried in water and chlorinated to form a slurry of insoluble lime impurities in a concentrated solution of calcium hypochlorite. The slurry is pumped to mud separator 20 where the insoluble impurities are removed as mud and the calcium hypochlorite solution is returned to forced-growth crystallizer 12. This embodiment allows increased rates of fines and insoluble impurities removal without a proportionate increase in the flow rate through mud separator 20. The advantage of operating with an increased rate of fines removal is in the increased crystal size and increased production rate of dibasic calcium hypochlorite attainable thereby with a reduced flow rate through mud separator 20; the flow rate through mud separator being adjusted in proportion to the amounts of insoluble impurities in the lime. Low cost lime with high concentrations of insoluble impurities can thus be used to economic advantage in view of the fact that the cost of lime, is a major item in the production of calcium hypochlorite.

The slurry of coarse dibasic calcium hypochlorite crystals produced in forced-growth crystallizer 12 is conveyed to dibasic separator 22 and recovered from the dibasic mother liquor. The crystals are divided into two portions, one of which is chlorinated in dibasic chlorinator 24 to produce a slurry of neutral calcium hypochlorite crystals. The second portion of dibasic crystals is added to hemibasic crystallizer 26 and admixed with the slurry of neutral calcium hypochlorite dihydrate crystals to produce hemibasic calcium hypochlorite crystals which are separated and chlorinated as discussed above.

More in detail, the process of the present invention initially admixes lime with a basic calcium hypochlorite mother liquor which is recycled from a subsequent reaction step, to form a slurry. The lime employed can be any suitable lime source having an active lime content of from about 85 to about 99 percent, where active lime is defined by the weight percent of $Ca(OH)_2$ in the lime. The lime employed includes impurities such as iron compounds, silica, aluminum salts, magnesium salts, manganese, unburned limestone (calcium carbonate and magnesium carbonate) and other compounds in trace quantities. These impurities represent from about 1 to about 15, and generally from about 2 to about 8 percent by weight of the lime.

The lime is slurried in recycled mother liquors containing relatively low concentrations of calcium hypochlorite ion. Suitable mother liquors include aqueous solutions recovered as recycle streams from subsequent operations such as, for example, the filtrates generated during the separation of crystalline basic calcium hypochlorite compounds from their aqueous slurries. Substitution of water for the mother liquors is also suitable. The lime slurries produced have a solids content of at least about 20 percent and are pumped to a crystallizing zone.

Also supplied to the crystallizing zone is a concentrated solution of calcium hypochlorite or a suspension of crystalline $Ca(OCl)_2.2H_2O$ in saturated solution which reacts with lime to produce dibasic calcium hypochlorite $Ca(OCl)_2.2Ca(OH)_2$; and also serves as the elutriating solution for the removal of fines. The concentrated solution is preferably near saturation, containing about 20 percent by weight of $Ca(OCl)_2$.

The crystallizing zone employs as a crystallizing apparatus any type of a "forced growth" crystallizer including, for example, a circulating mixed suspension crystallizer equipped with an elutriation zone for fines trapping.

The forced growth crystallizer employed in the novel process of this invention has a mixed suspension crystallizer body. This suspension body is preferably equipped with a draft tube agitation arrangement to maximize the weight of crystals which may be carried in suspension with a minimum of agitation power. Sedimentation of coarse crystals in the suspension as static, inactive beds on the bottom of the vessel is thereby avoided.

Above the suspension and in direct communication therewith, there is a quiescent elutriation zone of enlarged cross section. This zone remains free of large crystals of the dibasic calcium hypochlorite because of lack of sufficient agitation. A slow controlled rate of solution flow is maintained upward through the elutriation zone. Finely divided insoluble mud residues from the lime remain suspended in this elutriation zone together with particles comprised of calcium hydroxide, including unreacted lime particles and small crystalline nuclei of the dibasic calcium hypochlorite. Due to the progressive enlargement of the cross section of this elutriation zone, the upward flow rate of solution gradually diminishes so that the solids in suspension gradually increase in concentration. However, at the very top of the zone, and at flow velocities less than the sedimentation rate of residual solids, a solution free of solids may be withdrawn if this feature is of advantage in the operation of the process. Insoluble impurities, solids, and lime particles with the slowest sedimentation velocity, will then segregate in the uppermost level of the zone next to the clear solution. Small dibasic crystals with a more rapid sedimentation rate segregate in the lowest levels of the zone near the agitated suspension of the large dibasic crystals. Operation of the forced growth crystallizer thus allows the separate withdrawal of a clear solution, a slurry of residual lime muds and unreacted lime particles, or a stream composed predominantly of nuclei and fine crystals of dibasic calcium hypochlorite while leaving the suspension of the coarse crystals.

As the flow rate in the elutriation zone is progressively increased, lime muds and unreacted lime particles are removed as fast as they are accumulated in the suspension thereby effectively eliminating these mud and lime particle zones from the elutriation zone. In this event, the zone of excess fine crystals will rise into contact with the clear solution zone at the surface while also being in contact with the mixed suspension zone of larger dibasic crystals at the bottom of the elutriation zone. A sufficient supply of fine crystals is therefore available to replace the larger dibasic crystals as they are withdrawn, thereby reseeding the main suspension as required for continuous operation.

The forced-growth crystallizing zone of the process of this invention permits the isolation of the excess fine crystalline nuclei of the dibasic hypochlorite rapidly and effectively from the coarser suspension of product crystals within this elutriation zone. Once the excess fine crystal nuclei are thus isolated, they may be removed and further treated as described below. Excesses of nucleation, which would otherwise cause a depression of the size of the product crystals, are thereby avoided.

It is recognized in the art that more rapid crystal growth requires higher degrees of supersaturation of the mother liquor and that this in turn causes an even higher rate of formation of the crystalline nuclei. It follows, therefore, that the crystal size will normally be smaller for rapid rates of crystal growth than for the slower rates. Under the forced growth procedure, facilities are provided for the isolation, removal and destruction of excess crystalline nuclei in large amounts. At the more rapid rates of crystal growth, the associated increase in the nucleation rate is then cancelled by the isolation and removal of the excess nuclei so that crystals of enlarged size can be grown at production rates well beyond those attainable without the forced growth procedures.

Optional methods of operating the forced growth crystallizer for the dibasic calcium hypochlorite may be elected in conformity with more specific objectives. Thus, it has been indicated above that various solid entities in the system can be allowed to concentrate in separate positions in the elutriation zone as a consequence of the different sedimentation rates. This then allows the removal of solution relatively free of solids from the uppermost part of the elutriation zone. This solution will also have the lowest possible concentration of dissolved $Ca(OCl)_2$ and will then be generally free of active hypochlorite ion. In conformity with the findings of Sprauer and Mohan, this then would constitute a source of solution for use in making a lime slurry to be fed to the mixed suspension zone of the crystallizer. The very low concentration of $Ca(OCl)_2$ at the top of the elutriation zone is due to the fact that this solution slowly progresses upward through a relatively concentrated suspension of excess unreacted lime present in the elutriation zone because of the relatively rapid separation tendency of the unreacted lime from the coarse suspension of the dibasic crystal below.

In an alternate embodiment, elutriation zone flow rates are increased to an extent where insoluble impurities present in the lime and the unreacted lime particles both attain a position at the top of the elutriation zone. Operation under these conditions allows the recovery of a slurry of lime muds and unreacted lime relatively free of the excess of crystalline dibasic nuclei from the top of the elutriation zone. This slurry may be further processed by chlorination to allow separate recovery of the lime values as soluble $Ca(OCl)_2$ and the residual insoluble lime mud. Fine crystalline dibasic hypochlorite relatively free of such muds and unreacted lime may then also be withdrawn separately at an appropriate level of the elutriation zone and utilized for other available purposes as a partially purified crystalline basic calcium hypochlorite. This fine crystalline material may also be chlorinated further to provide conversion to less basic crystal form such as the hemibasic $Ca(OCl)_2$—$Ca(OH)_2$ or the neutral dihydrate type, $Ca(OCl)_2$—$2H_2O$.

In a preferred embodiment, the elutriation velocity is so adjusted that insoluble impurities, unreacted lime, and the excess of the fine crystalline dibasic hypochlorite are all simultaneously drawn from the top of the zone. This mixture is then chlorinated to convert both the unreacted lime and the fine dibasic product to the neutral dihydrate crystal in saturated $Ca(OCl)_2$ solution. This chlorinated mixture is then returned to the main suspension of the large dibasic crystals to provide the dominant source of hypochlorite ion required for forced growth of the larger dibasic calcium hypochlorite crystals.

In the processes of the prior art, the external source of hypochlorite ion used to promote the growth of the dibasic crystal is limited to the concentrated or saturated solutions to avoid to the greatest extent possible sources of nucleation which would otherwise depress the maximum crystal size obtainable. In the process of the present invention, such a precaution is not necessary in view of the fact that excess nucleation is easily removed from the main suspension of large crystals. Suspensions of the crystalline dihydrate hypochlorite can, therefore, be used as a source of externally generated hypochlorite ion in spite of the fact that this higher concentration of hypochlorite ion induces an increased nucleation rate.

The neutral crystalline dihydrate present in the suspension of the coarse dibasic crystals stabilizes the concentration of active hypochlorite ion in the main suspension at an equilibrium value representing a balance between the dissolving rate of the neutral hypochlorite crystals and the depletion rate of the hypochlorite ion due to the growth of the enlarged dibasic crystals in suspension. This equilibrium concentration of active hypochlorite ion is proportional to the amount of neutral crystalline dihydrate present with the coarse dibasic crystals. Since neutral crystalline dihydrate dissolves quite rapidly, the residual of undissolved neutral dihydrate crystals remains low. Without such stabilization of the hypochlorite ion concentration, the saturated hypochlorite solution from the external source becomes progressively depleted of active hypochlorite ion and with this depletion, there is also a progressive decline in the growth rate of the dibasic crystal.

A further prerequisite for maximizing the production rate of coarse crystalline dibasic calcium hypochlorite is satisfied by maximizing the seed bed of coarse crystalline material in the crystallizer suspension. The crystal surface available for crystal growth is the surface of exposed crystals in the suspension. Efficient suspension means must, therefore, be employed so that growth surface is not lost by sedimentation and stagnation of the crystals on the bottom of the suspension vessel. Moreover, the more surface that is available for growth in the suspension, the slower the required growth rate to achieve a given production rate. For illustrative purposes, the relation will be normalized to 0.028 cubic meter of suspension. If the suspension density is maintained at 480.5 kgs. crystals per cubic meter, and the production rate is 160 kgs. per hour per cubic meter, then the average retention time is three hours. On the other hand, if the suspension density is maintained at 160.2 kgs. crystals per cubic meter, the retention time for the same production rate is only one hour. The latter growth rate must, therefore, be three times faster than the former if the same crystal size is made in both cases. This is rarely possible. Due to increased nucleation resulting from the faster growth rate, the crystal size for the shorter retention time will also usually be smaller. It is a characteristic of forced growth type crystallizers that the weight of crystals in suspension can be controlled independently of the composition of the feed streams and mother liquor effluent streams. If no suspension is removed through the product centrifuge, the weight of crystals in suspension will continue to increase until the limit is reached at which the draft tube agitation system fails to circulate the crystals and mother liquor due to thickening of the suspension.

In the forced growth crystallization of the dibasic calcium hypochlorite, the maximum weight of seed crystals which can be carried in suspension is equal to the limit at which the suspension thickens to a degree where the draft tube agitation system fails to circulate the suspension. The heavier the suspension, the slower the required growth rate of the crystals hence growth is promoted at lower levels of active hypochlorite ion in the mother liquor than would be the case for lower weights of crystals in suspension. The lower the concentration of active hypochlorite in solution, the lower the spontaneous nucleation rate within the suspension and also the less probability of nucleation when the dry lime feed is slurried in recycled mother liquor as a convenient means for bringing the lime feed into intimate association with the suspension of coarse dibasic crystals.

A further advantageous achievement using forced-growth crystallization of the dibasic calcium hypochlorite is the ability to operate with mother liquor containing higher concentrations of the coproduced calcium chloride. The volume of waste liquor from the process is thereby reduced and further stages to recover marketable by-products from the waste $CaCl_2$ stream are simpler and more economical. According to Sprauer, $CaCl_2$ in excessive concentrations in the mother liquor results in an increase in dibasic nucleation and a degradation in the structure of the crystal. With forced-growth crystallization, these deleterious effects are minimized to tolerable levels by elimination and destruction of the excess nuclei and by operating with denser suspensions and lower degrees of supersaturation which tend to improve crystal structure and strength.

The process of the present invention establishes in the crystallizing zone an elutriation zone which is in extensive and intimate contact with the main suspension of dibasic crystals. Once the lime slurry has been injected into the active part of the main suspension, it begins to dissolve at a finite rate to induce the growth of the existing seed crystal in the suspension. At the same time, some of the unreacted lime also begins to leave the main suspension by elutriation. This prevents an excess of lime from accumulating in the suspension. The lime feed rate can, therefore, be balanced in relation to the elutriation rate to maintain an unreacted lime concentration in the main suspension sufficient to promote progressive crystal growth of the dibasic crystals, but insufficient to increase the spontaneous rate of new nuclei formation or otherwise interfere with the growth of the dibasic crystals. The relatively high concentration of such unreacted lime in the elutriation zone then affords additional intensive contact with the mother liquor in this location to further deplete the active hypochlorite ion concentration to negligible values before this liquor is recycled. Also included within the scope of usable operating procedures are embodiments where a part of the lime slurry may be channelled directly to the fines slurry chlorination stage and where a portion of the chlorine for forming the dibasic crystals from lime is injected directly into the suspension of the dibasic crystals as two alternate means for further variation of the 30 residual of unreacted lime in the suspension of the dibasic crystals.

In a preferred embodiment, the elutriation rate is operated at a slower rate to permit a small fraction of seed crystals to grow from nuclei to sizes in excess of the elutriation subsistence rate.

As illustrated in the process of FIG. 1, where preferably limes having high active lime concentrations are used, a major fraction of crystals of dibasic calcium hypochlorite of a size below about 50 microns are preferably removed from the upper portion of the crystallizer as an aqueous slurry of fines along with unreacted lime particles and minor amounts of insoluble impurities present in the lime. The slurry of fines and insoluble impurities is fed to a fines chlorination zone which includes any suitable chlorination vessel having agitation means and cooling means. Chlorine is fed to the slurry in amounts suitable to chlorinate the unreacted lime particles and fine crystals of dibasic calcium hypochlorite and form an aqueous slurry of insoluble impurities and calcium hypochlorite dihydrate crystals suspended in saturated calcium hypochlorite solution. This slurry is recycled to the crystallizing zone for producing dibasic calcium hypochlorite crystals.

In this embodiment, coproduct calcium chloride and suspended insoluble impurities in the mother liquor are removed from the process by purging a portion of the dibasic mother liquor separated in dibasic separator 22.

In alternate embodiments illustrated in FIGS. 2 and 3, suitable for use with lime containing higher concentrations of insoluble impurities, a portion of the slurry of fines and insolubles from the dibasic calcium hypochlorite crystallizer is fed to a mud separator. The fine crystals of dibasic calcium hypochlorite in the slurry serve as a filter aid to provide rapid separation of the solids from the aqueous solution of calcium chloride containing minor amounts of calcium hypochlorite in solution.

A portion or all of this stream is purged from the process to remove coproduct calcium chloride from the system.

The mud (fines and insolubles) solid phase may be pumped to cake chlorinator 18 and chlorinated to recover calcium hypochlorite values as an aqueous solution of calcium hypochlorite. The calcium hypochlorite solution is recycled to dibasic crystallizer 12 after filtration to remove the insoluble lime muds which are discarded.

Chlorine may also be fed directly into the dibasic calcium hypochlorite crystallizer zone, if necessary, to satisfy process stoichiometry.

The slurry of dibasic calcium hypochlorite crystals produced in dibasic crystallizer 12 is conveyed to dibasic separator 22. Dibasic separator 22 is a centrifuge, filter or other suitable solid-liquid separating apparatus capable of separating a moist cake of dibasic calcium hypochlorite from a dibasic mother liquor. A preferred embodiment of dibasic separator 22 is a perforated basket centrifuge.

This separator allows any fine, suspended insolubles in the mother liquor to flow through the cake of coarse dibasic crystals and also through the retaining screen thereby allowing the recovery of dibasic calcium hypochlorite crystals free of the insoluble impurities present in the lime.

Dibasic calcium hypochlorite mother liquor recovered from dibasic separator 22 is substantially an aqueous solution of calcium chloride containing concentrations of calcium hypochlorite in the range of from about 2 to about 4 percent by weight of $Ca(OCl)_2$. Dibasic mother liquor is recycled to mixing tank 10 to be used as the aqueous phase of the lime slurry.

As mentioned above, a portion of this dibasic mother liquor may be purged to remove coproduct $CaCl_2$ from the system.

The cake of dibasic calcium hypochlorite crystals produced is conveyed to dibasic chlorinator 24. In one embodiment, chlorine is admixed with the dibasic crystals to produce a slurry of hemibasic calcium hypochlorite crystals $Ca(OCl)_2 \cdot \frac{1}{2}Ca(OH)_2$.

In a preferred embodiment, hemibasic calcium hypochlorite crystals are produced in the absence of a chlorination step by admixing a portion of the dibasic calcium hypochlorite crystals with an aqueous slurry of calcium hypochlorite dihydrate crystals illustrated in FIGS. 2 and 3 and as described in U.S. Pat. No. 2,374,835, issued to H. L. Robson. The reaction, which proceeds in accordance with the following equation:

$$3Ca(OCl)_2 \cdot 2H_2O + Ca(OCl)_2 \cdot 2Ca(OH)_2 \rightarrow 4[Ca(OCl)_2 \cdot \tfrac{1}{2}Ca(OH)_2] + 6H_2O,$$

is carried out at temperatures within the range of from about 10° to about 80° C., preferably from about 20° to about 50° C. and employing equilibration times of at least about 30 and preferably from about 120 to about 180 minutes.

The slurry of hemibasic calcium hypochlorite crystals is transported to hemibasic separator 28, which is a centrifuge, filter or other solid-liquid separating apparatus capable of separating a moist cake of hemibasic calcium hypochlorite crystals from hemibasic mother liquor.

Hemibasic calcium hypochlorite mother liquor recovered from hemibasic separator 28 is similarly an aqueous solution of calcium chloride containing concentrations of calcium hypochlorite in the range of from about 6 to about 10 percent by weight of $Ca(OCl)_2$. Hemibasic mother liquor is recycled to mixing tank 10 and/or dibasic chlorinator 24.

Chlorination reactions in dibasic chlorinator 24 and hemibasic chlorinator 30 are carried out at sufficiently high temperatures to allow operation using ambient cooling water. This permits a substantial energy and cost savings over processes of the prior art which require evaporative cooling during the chlorination reaction.

The cake of hemibasic calcium hypochlorite crystals is conveyed to hemibasic chlorinator 30 and admixed with chlorine, sodium hydroxide and water to produce a paste slurry of neutral calcium hypochlorite. The paste slurry is comprised of solid calcium hypochlorite dihydrate crystals and a paste liquor which is predominantly an aqueous solution of sodium chloride and calcium hypochlorite. The paste contains calcium hypochlorite dihydrate crystals in a concentration in the range of from about 20 to about 40, and preferably from about 24 to about 36 percent by weight. The liquid phase comprises at least 50 percent by weight and is preferably from about 54 to about 78 percent by weight of the paste slurry. Variable amounts of sodium chloride are also present in the paste slurry. Crystalline characteristics, such as size and form, of the neutral calcium hypochlorite dihydrate crystals produced in the paste slurry, produced in the novel process of the present invention, are unimportant as further filtration of the paste slurry to produce a wet cake having a controlled weight concentration of water is not required. In fact, it is preferred to produce a paste slurry containing small, fine crystals of neutral calcium hypochlorite, crystals which are undesirable for the filtration step required by processes of the prior art in which conventional drying methods are used to produce granular calcium hypochlorite. The paste slurry produced by the process of this invention is suitable for use directly in spray graining or spray drying apparatus for the production of granular calcium hypochlorite particles.

Suitable apparatus for spray graining calcium hypochlorite slurries includes, for example, the rotary drum apparatus described in U.S. Pat. No. 4,276,349, issued June 30, 1981, to W. C. Saeman. The entire disclosure of this patent is incorporated by reference herein. Briefly in the spray graining process, calcium hypochlorite paste slurry is conveyed to the distributing zone of the spray grainer. The distributing zone has a lower portion which contains a bed of solid calcium hypochlorite particles. When the spray grainer is rotated, a moving bed of particulate solids gradually progresses from the feed end of the spray grainer to the discharge end. Positioned around the interior circumference of the spray grainer are a series of flights or lifters which lift particles of calcium hypochlorite from the moving bed in the lower portion to the upper portion of the distributing zone. The upper portion of the distributing zone contains a plurality of spray nozzles which continuously spray the calcium hypochlorite slurry as fine droplets onto the solid particles falling from the lifters.

Heated air or other inert gas contacts the calcium hypochlorite particles wetted with the slurry to simultaneously evaporate and remove water and to deposit a thin solid layer of the calcium hypochlorite-containing component of the slurry on the surface of the wetted particles. The coated particles fall to the moving bed and continue to be lifted, dropped and coated until they are discharged from spray grainer.

In an alternate embodiment, multi-layered granular calcium hypochlorite particles are produced in a fluidized bed apparatus as described in, for example, U.S. Pat. No. 3,969,546, issued July 13, 1976, to W. C. Saeman. In a fluidized bed apparatus, a moving bed of solid core particles of calcium hypochlorite is suspended by means of a suitable gas such as nitrogen or air to form a distribution zone. The aqueous paste of calcium hypochlorite dihydrate particles is sprayed onto the suspended core particles in the bed. As the calcium hypochlorite paste coats the surface of the core particles, the heated air or nitrogen gas in the bed simultaneously removes and evaporates the water component of the paste, leaving a thin layer of soid calcium hypochlorite on the core particles initially fed into the suspended bed. Freshly deposited pliable solids are compacted and hardened with the hard dry core particles by collision impacting against one another. The coating technique is continued as the particles contact additional spray of calcium hypochlorite paste and multi-layered granular particles of calcium hypochlorite are produced.

While it is preferred to produce multi-layered granular particles of calcium hypochlorite, the paste of calcium hypochlorite produced by the novel process of the present invention is also suitable for use in spray drying processes.

As preferred embodiments, the granular calcium hypochlorite particles comprise a core of calcium hypochlorite encapsulated with a plurality of layers of calcium hypochlorite. The initial core of calcium hypochlorite generally has a diameter in the range of from about 200 to about 2000 microns. Following the application of layers of calcium hypochlorite by the spray graining process, the coated particles have a diameter ranging from about 400 to about 5000 microns. As discharged from the spray graining apparatus, the rounded calcium hypochlorite particles have a moisture content in the range of from about 5 to about 30 percent by weight. Where the moisture content is above about 10 percent by weight, the particles are normally conveyed to a drying apparatus such as, for example, a rotary dryer. Rounded calcium hypochlorite particles produced for commercial applications such as the sanitation and disinfection of water bodies, have an available chlorine content (on a dry basis) generally in the range of from about 50 to about 85 percent by weight.

The novel process of the present invention produces neutral crystalline calcium hypochlorite slurries of high assay suitable for the production of granular calcium hypochlorite particles without requiring the filtration of these slurries. Under forced growth conditions, dibasic calcium hypochlorite crystals can be grown larger and faster and are readily separated as purified crystals from other insoluble and soluble impurities in the mother liquor. Also, in instances of control default where excess nucleation occurs which would depress the crystal size in suspension, the forced growth methods allow more rapid recovery of the normal operating conditions to avoid or eliminate completely any major decline in the product crystal size. With the coarser crystal obtained by this invention, the washing efficiency of the crystal is also improved due to the diminished surface/volume ratio of the crystal thereby increasing the overall yield of crystalline product with no decline in washing efficiency.

The process of the present invention can employ low grade lime sources as insoluble impurities are effectively isolated and removed. The process may be operated batchwise or continuously although continuous operation is preferred.

The following EXAMPLE is presented to illustrate the process of the present invention without any intention of being limited thereby. All parts and percentages are by weight unless otherwise specified.

EXAMPLE

Solid hydrated lime, containing 95.5% $Ca(OH)_2$ and 4.5% inert materials is charged at a controlled rate of 607 kg/hr. to a slurry makeup tank fitted with a turbine agitator. Simultaneously, an average of 1318 kg/hr. of basic hypochlorite liquor containing 4.5 wt. % $Ca(OCl)_2$ and 24% $CaCl_2$ is charged to the tank on level control from a recycle mother liquor surge tank.

The resultant lime slurry which contains 30% suspended $Ca(OH)_2$ solids, is pumped from the tank to the lower part of a dibasic hypochlorite crystallizer at a controlled rate of 1925 kg/hr.

The dibasic hypochlorite crystallizer consists of a lower cylindrical section fitted with a draft tube agitator for slurry suspension and water cooling coils to remove the heat produced by the chlorination reactions. The upper conical section is set up as a quiescent elutriation zone. The temperature of the vessel is controlled at 40°–50° C. by regulation of the flow of cooling water.

A stream of mother liquor, inerts and fine crystals is removed from the top of the elutriation zone at a controlled rate. About 90% of the thin slurry is pumped to a fines chlorinator tank where chlorine is added to produce neutral calcium hypochlorite slurry. The fines chlorinator is an agitated tank equipped with a liquid chlorine dip tube feed line, water inlet and chilled water cooling coils. The neutral hypochlorite slurry produced in this chlorinator at 30° C. is returned to the dibasic hypochlorite crystallizer on level control.

The remaining 10% of the overhead slurry is filtered on a rotary vacuum filter to remove suspended solids and the resultant liquor, which contains 3% $Ca(OCl)_2$ and 22% $CaCl_2$, is purged to remove byproduct $CaCl_2$ from the system. Wet solids from the filter are conveyed to a mud chlorinator where water and chlorine are added to convert the suspended basic hypochlorite fine crystal to calcium hypochlorite solution. The mud chlorinator is similar in design to and is operated in the same manner as the fines chlorinator. Effluent from the mud chlorinator is filtered in a pressure filter to remove suspended solids which are washed with water and discarded, and the clarified mother liquor is combined with liquor from the fines chlorinator and is returned to the upper portion of the lower zone of the dibasic crystallizer vessel to elute inerts and excess crystal nuclei from the crystal suspension.

The exact flow rates of process streams around the dibasic hypochlorite crystallizer, fines chlorination, inerts removal system and lime slurry feed system are controlled to obtain control of the dibasic hypochlorite crystal size and water, chlorine and $CaCl_2$ balances in the system. In the specifiC example, effluent from the top of the crystallizer elutriator averages 14,873 kg/hr., calcium chloride in the purge liquor averages 337 kg/hr., total water and chlorine feed averages 887 kg/hr. and 285 kg/hr., respectively.

Dibasic crystal slurry is removed from the lower section of the crystallizer at an average rate of 1491 kg/hr. on suspension density control and is pumped to a perforated basket centrifuge where 699 kg/hr. of wet crystal is separated from the mother liquor. The liquor (792 kg/hr.) is pumped to a hold tank for recycle to the lime slurry makeup tank.

Wet dibasic hypochlorite crystals from the centrifuge are split into two parts, one of 406 kg/hr. is charged under controlled rate to a dibasic chlorinator where recycle hemibasic mother liquor 1104 kg/hr. and chlorine 157 kg/hr. is added to produce neutral calcium hypochlorite dihydrate crystal slurry. The chlorinator is of the same design and is operated in the same manner as the fines chlorinator. The calcium hypochlorite dihydrate slurry which contains 23% $Ca(OCl)_2$ is continuously removed from the dibasic chlorinator at an average rate of 1667 kg/hr. and is charged to the hemibasic crystallizer with the second portion (293 kg/hr.) of the wet dibasic crystal cake. Proportions of the dibasic crystal split are adjusted as necessary to maintain the hemibasic crystal slurry suspension composition as desired.

The hemibasic crystallizer, which operates at 40°–50° C., is equipped with a draft tube slurry agitation system and tempered water coils.

Hemibasic crystal slurry, which contains 27% suspended solids, is continuously removed from the crystallizer and fed to a perforated basket centrifuge where the crystals are separated, washed with water and wet crystals are discharged to the paste chlorinator at a rate of 659 kg/hr.

A portion of the mother liquor, 525 kg/hr., is purged to the lime slurry makeup system to remove 143 kg/hr. of byproduct calcium chloride from the hemibasic crystallization section of the process. The balance of the mother liquor and wash liquor from the hemibasic centrifuge are recycled to the dibasic crystal chlorinator.

The paste chlorinator is of the same design and is operated in the same manner as the dibasic fines chlorinator. Feed to the paste chlorinator averages 659 kg/hr. hemibasic crystals, 235 kg/hr. of chlorine, 278 kg/hr. of 50% caustic and 714 kg/hr. of water. Effluent neutral calcium hypochlorite dihydrate slurry (1885 kg/hr.) which contains 34% $Ca(OCl)_2$, 11% NaCl and 55% water, is continuously removed from the paste chlorinator and is suitable feed for a spray grainer drying system.

What is claimed is:

1. A continuous process for producing granular calcium hypochlorite particles which comprises:
   (a) admixing lime and an aqueous liquid in a mixing zone to form a lime slurry;
   (b) feeding said lime slurry to a crystallizing zone;
   (c) feeding into said crystallizing zone a calcium hypochlorite-containing liquid to react with said lime to produce a slurry of coarse dibasic calcium hypochlorite crystals and to elutriate a fines slurry comprised of particles of calcium hydroxide from said crystallizing zone;
   (d) conveying said fines slurry to a fines chlorinating zone;
   (e) chlorinating said fines slurry to produce said calcium hypochlorite-containing liquid and returning said calcium hypochlorite-containing liquid to said crystallizing zone;
   (f) separating said coarse dibasic calcium hypochlorite crystals from a dibasic hypochlorite mother liquor;
   (g) reacting said coarse dibasic calcium hypochlorite crystals in a dibasic chlorinating zone with a chlorinating agent to produce a slurry of hemibasic calcium hypochlorite crystals;
   (h) separating said hemibasic calcium hypochlorite crystals from a hemibasic hypochlorite mother liquor;
   (i) reacting said hemibasic calcium hypochlorite crystals with chlorine in the presence of an aqueous alkali metal hydroxide solution to produce an aqueous paste of calcium hypochlorite dihydrate; and
   (j) spraying said aqueous paste of calcium hypochlorite dihydrate into a heated zone to evaporate water and produce granular calcium hypochlorite particles.

2. The process of claim 1 in which said aqueous liquid in said mixing zone is a basic hypochlorite mother liquor, water or mixtures thereof.

3. The process of claim 2 in which said calcium hypochlorite-containing liquid is an aqueous solution of calcium hypochlorite or an aqueous suspension of calcium hypochlorite dihydrate crystals.

4. The process of claim 3 in which said chlorinating agent in said dibasic chlorinating zone is calcium hypochlorite dihydrate crystals or chlorine.

5. The process of claim 4 in which said aqueous paste of calcuim hypochlorite dihydrate comprises from about 20 to about 40 percent by weight $Ca(OCl)_2$.

6. The process of claim 5 in which said aqueous paste is sprayed onto a heated bed of calcium hypochlorite core particles to evaporate water and produce multilayered granular calcium hypochlorite particles.

7. The process of claim 3 in which said crystallizing zone is a forced-growth crystallizer.

8. The process of claim 4 in which said basic hypochlorite mother liquor in said mixing zone is dibasic hypochlorite mother liquor, hemibasic hypochlorite mother liquor of mixtures thereof.

* * * * *